US008799487B2

(12) United States Patent

Dandige et al.

(10) Patent No.: US 8,799,487 B2

(45) Date of Patent: Aug. 5, 2014

(54) BUILD A PERSON OBJECT FROM MULTIPLE CONTACTS

(75) Inventors: Maithili Dandige, Sammamish, WA (US); Govind Varshney, Sammamish, WA (US); Alexander Sourov, Seattle, WA (US); Sainath Narendranath Thadkal, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 143 days.

(21) Appl. No.: 13/288,091

(22) Filed: Nov. 3, 2011

(65) Prior Publication Data

US 2013/0117458 A1 May 9, 2013

(51) Int. Cl.
*G06F 15/16* (2006.01)

(52) U.S. Cl.
USPC .......................................... 709/228; 707/792

(58) Field of Classification Search
None
See application file for complete search history.

(56) References Cited

U.S. PATENT DOCUMENTS 7,480,915 B2 * 1/2009 Costa Requena et al. .... 719/311
7,571,228 B2 * 8/2009 Classen et al. ................ 709/224
7,814,214 B2 * 10/2010 Classen et al. ................ 709/227
7,966,369 B1 * 6/2011 Briere et al. .................. 709/204
7,970,846 B2 * 6/2011 Daniell et al. ................ 709/206
8,117,261 B2 * 2/2012 Briere et al. .................. 709/204
8,140,633 B2 * 3/2012 Daniell et al. ................ 709/206
2006/0195472 A1 8/2006 Cadiz
2006/0239279 A1 * 10/2006 Classen et al. ................ 370/401
2006/0242235 A1 * 10/2006 Classen et al. ................ 709/204
2008/0189293 A1 8/2008 Strandel
2009/0043844 A1 2/2009 Zimmet
2009/0157615 A1 6/2009 Ross et al.
2009/0157732 A1 * 6/2009 Hao et al. ...................... 707/102
2009/0177744 A1 * 7/2009 Marlow et al. ................ 709/204
2009/0248868 A1 * 10/2009 Classen et al. ................ 709/224
2010/0057859 A1 3/2010 Shen
2010/0268742 A1 10/2010 Ring
2011/0119596 A1 5/2011 Nesladek

FOREIGN PATENT DOCUMENTS

KR 20030000108 A 1/2003
KR 20100050816 A 5/2010

OTHER PUBLICATIONS

International Search Report and Written Opinion for PCT/US2012/063128 mailed Feb. 26, 2013.
Network Address Book; Synchronoss Technologies, Inc. copyright 2010, 3 pages.

* cited by examiner

*Primary Examiner* — Ninos Donabed
(74) *Attorney, Agent, or Firm* — Tom Wong; Jim Ross; Micky Minhas

(57) ABSTRACT

A data structure that represents a person is created. The data structure comprises a person object. The person object comprises one or more contact objects. When it is determined that the person is a global address list contact, first contact information for the person is obtained from a global address list store and stored in a first contact object. When it is determined that the person is an email contact, second contact information is obtained from a contact store and stored in a first memory cache. When it is determined that the second contact information includes a global address identifier, the global address identifier is stored in the second contact object. A person identifier is created for the person that identifies the person. The person identifier is stored in the first contact object and in the second contact object.

20 Claims, 11 Drawing Sheets

400

BUILD A PERSON OBJECT FROM MULTIPLE CONTACTS

BACKGROUND

Email applications commonly store and display information about a user's personal contacts. The email applications permit a user to enter, modify and display the contact information on an input device. Ideally, each contact stored in an email application corresponds to a single person. However, often multiple contact records are entered for the same person.

In addition to email applications, contact information may be derived from other sources. For example contact information may be found in electronic documents and from third parties, such as social networking applications. When displaying contact information from multiple sources on the input device, duplicate contact information may sometimes be displayed.

SUMMARY

Embodiments of the disclosure are directed to a method implemented on an electronic computing device for creating a data structure that represents a person. On the electronic computing device, an entry identifier is received. The entry identifier identifies the person. The entry identifier is stored in a data structure in a first memory cache on the electronic computing device. The data structure comprises a person object. The person object comprises one or more contact objects. A determination is made as to whether the entry identifier indicates that the person is a global address list contact. When it is determined that the entry identifier indicates that the person is a global address list contact, first contact information is obtained from a global address list store and the first contact information is stored in a first contact object in the data structure. When it is determined that the entry identifier does not indicate that the person is a global address list contact, a determination is made from the entry identifier as to whether the person is an email contact. The email contact is a contact in a contact store for an email application running on the electronic computing device. When it is determined that the entry identifier indicates that the person is an email contact, second contact information is obtained for the person from the contact store, the second contact information is stored in the data structure in the first memory cache on the electronic computing device, a determination is made as to whether the second contact information includes a global address identifier, and when it is determined that the second contact information includes the global address identifier, the global address identifier is stored in a second contact object in the data structure. The global address identifier identifies the person in the global address list store. A person identifier is created that identifies the person. The person identifier is stored in the first contact object. The person identifier is stored in the second contact object.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DETAILED DESCRIPTION

The present application is directed to systems and methods for creating an identifier for an entity and using the identifier to obtain and aggregate contact information for the entity. In this disclosure, the entity is a person. However, in examples, the entity may also refer to organizations that have emails, phone numbers and accounts on social networking sites.

The contact information may be obtained from a plurality of sources. When the contact information is obtained, the contact information is stored in a data structure on a client computer. The systems and methods for creating the identifier are initiated by a user action, such as hovering a cursor over a name in an email address. The user action initiates a runtime process in which the contact information is obtained, stored in the data structure, aggregated and used to create or update a user interface display that provides aggregated contact information for the person. In addition, presence information may be displayed along with the contact information. The presence information indicates a current presence status of the contact, for example, available, busy or away.

In this disclosure, the data structure that stores the contact information is referred to as a person object. The person object may include a plurality of contact objects, each contact object storing information for an associated contact. In this disclosure, the identifier for the person is referred to as a person identifier. The person identifier is stored in each of the plurality of contact objects in the person object. In addition, each of the plurality of contact objects in the person object is linked to each other. Thus, the person identifier may be used to locate each of the plurality of contact objects associated with a person.

The systems and methods for creating the person identifier are initiated during runtime, for example when the user hovers over a contact name. As discussed in more detail herein, the person identifier is one of several identifiers or keys that may be used to locate the person object. The keys and the person object are stored in a memory cache on a client computer.

In this disclosure, references to a person and to a person object may also apply to organizations that have emails, phone numbers and accounts on social networking sites.

Figure 1:
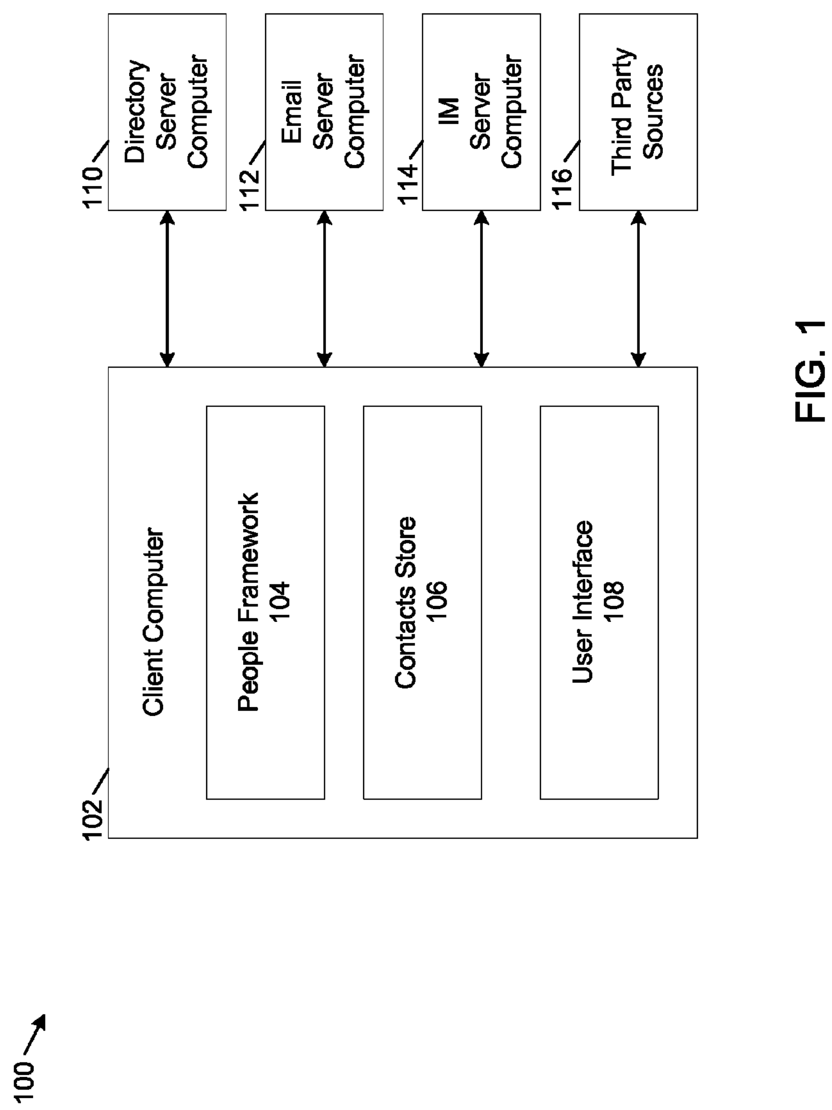
FIG. 1 shows an example system that supports the building of a person object.

FIG. 1 shows an example system 100 in which a person object may be built. The example system 100 includes a client computer 102, a directory server computer 110, an email server computer 112, an instant messaging (IM) server computer 114 and third party sources 116. The example client computer 102 includes a people framework 104, a contacts store 106 and a user interface 108.

The example client computer 102 runs an email application that includes a contact manager. The contact manager stores and maintains contact information for one or more contacts. The contact information includes example properties such as the contact name, address, phone number, job title, etc. An example email application is the Outlook® email personal information manager from Microsoft Corporation of Redmond, Wash.

The example people framework 104 provides a framework for obtaining contact information for a person from one or more sources and creating a person identifier for one or more contacts associated with the person. The people framework 104 also creates and updates a person object that comprises one or more contact objects and the person identifier. The people framework 104 is explained in more detail later herein.

The example contacts store 106 includes contact records for a plurality of contacts for the user of the client computer 102. Each contact record corresponds to a specific person. It is possible that two or more contact records may correspond to the same person, for example if a contact record was created twice for a person. The contact records are typically made available to the email application when a user selects a contact control on the email application of the client computer 102. In addition, the contact records may be accessed when contact information is displayed on a user interface of the client computer.

The example user interface 108 displays contact information for a person. Typically, the contact information is displayed when a user hovers over the name of a person in an email application or a document. Other mechanisms for triggering a display of contact information are possible. The contact information may be obtained from a variety of sources and aggregated on the display. For example, the contact information may be obtained from a global address list, from the contacts store of the email application or from a third party source such as Facebook or Linked-in. In addition, the user interface 108 may obtain and display presence information, indicating an availability status for the user. For example, the availability status may be available, busy or away. Other examples of availability status are possible.

The example directory server computer 110 is a server computer that runs a global directory service, for example the Active Directory® directory service from Microsoft Corporation of Redmond, Wash. The example global directory service typically includes directory information for users and computers within a network, typically a corporate network. When a contact stored in the contact store of the client computer 102 is also known to the global directory service, for example if the contact is an employee of the same corporation as the user, the global directory service typically includes a directory record for the contact. Thus, in the example system 100, although there may be multiple contact records for one person, the global directory service typically includes only one directory record for the person.

The example email server computer 112 is a server computer that runs an email application program. An example of a server computer that runs an email application program is the Exchange Server 2010 from Microsoft Corporation. The email server computer 112 may be an additional source of contact information for the people framework 104.

The example IM server computer 114 is a server computer that runs an instant messaging application program. An example of a server computer that runs an email application program is the Lync™ communications server computer produced by Microsoft Corporation of Redmond, Wash. The IM server computer 114 is typically used with a corresponding instant messenger application program that is installed on the client computer 102. An example of an instant messenger application program is the Lync™ instant messaging client from Microsoft Corporation. The example IM server computer 114 provides presence information to the instant messaging client. The instant messaging client provides the presence information for the contacts stored in the example email application on the client computer 102.

Contact information may also be obtained from third party sources 116. Examples of third party sources include social networking applications such as Facebook and Linked-In. Other examples of third party sources are possible. The methodology for obtaining contact information is obtained from third party sources is explained in more detail later herein.

Figure 2:
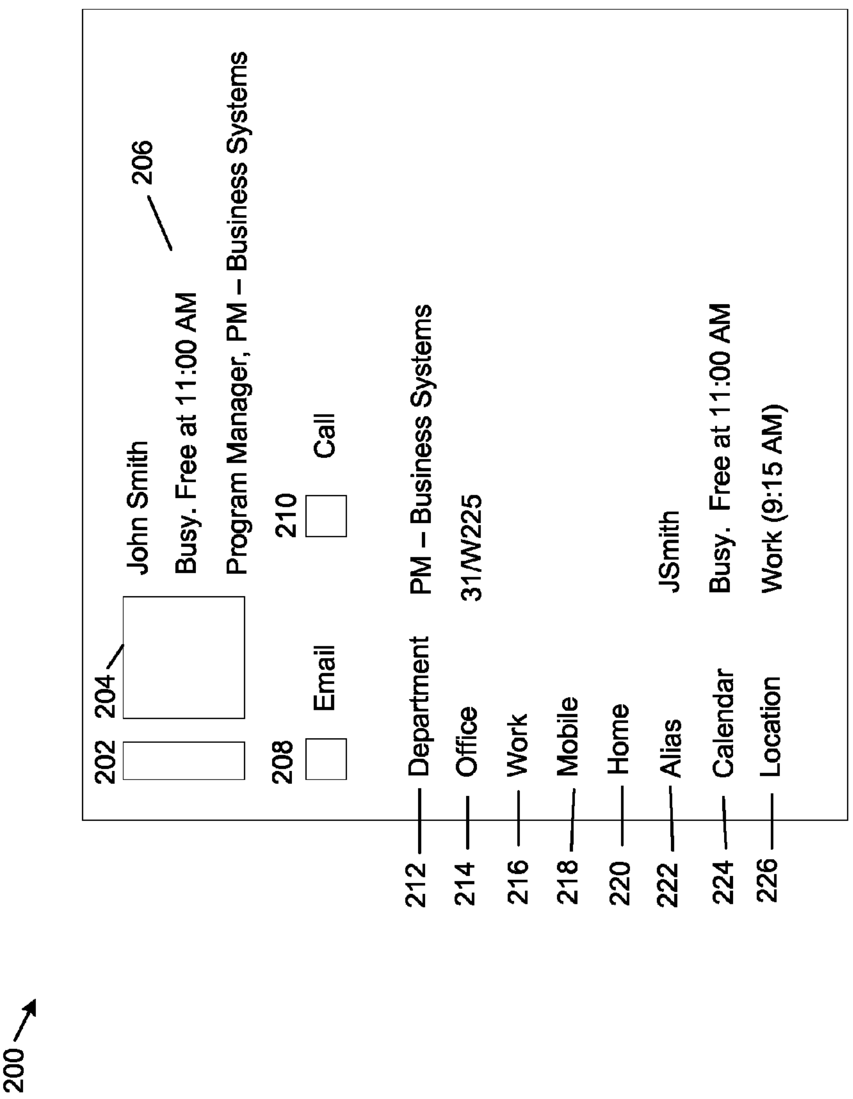
FIG. 2 shows an example contact information display.

FIG. 2 shows an example contact information display 200 that may be displayed via the user interface 108. The example contact information display 200 may be displayed, for example when the user hovers over an email address for a contact. Other examples of when the contact information display 200 is displayed are possible.

The example contact information display 200 includes a status summary 206 that displays the name of the contact, the current status of the contact and the business title of the contact. Other or different contact information may be included in the example status summary 206. The example contact information display 200 also includes a photo 204 of the contact and a presence indicator 202. The example presence indicator 202 may indicate a presence status for the contact via color, shading or other means. Typical statuses that may be displayed include available, busy and away. In examples, the presence indicator 202 may be green when the user is available, red when the user is busy and yellow when the user is away. Other colors are possible.

The example contact information display 200 also includes fields 212-226 that provide specific status information for the contact. For example, a calendar status 224 indicates an availability status for the contact and the location status 226 indicates the current location for the contact. Other or different types of status information may be included in the contact information display 200.

Figure 3:
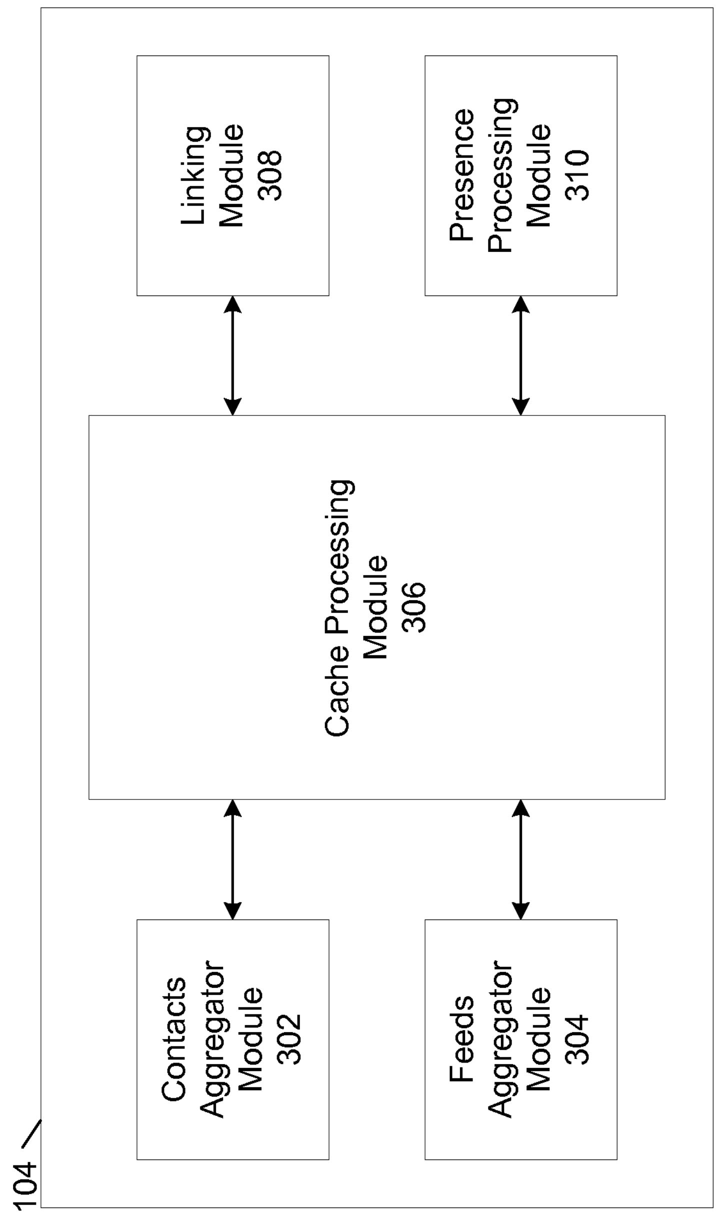
FIG. 3 shows example components of the people framework module of FIG. 1.

FIG. 3 shows example components of the people framework 104. The example people framework includes a contacts aggregator module 302, a feeds aggregator module 304, a cache processing module 306, a linking module 308 and a presence processing module 310.

The example contacts aggregator module 302 aggregates contact information obtained from one or more sources and stored in the people object and provides the aggregated contact information to the user interface 108. When redundant contact information is obtained from the people object, the contacts aggregator module 302 removes the redundant information from the aggregated contact information. When contact information is obtained from the people object, the contacts aggregator module 302 adds the contact information to the aggregated contact information. As a result, the aggregated contact information provided to the user interface 108 is a synthesis of the available contact information stored in the people object.

The example feeds aggregator module 304 aggregates activity feeds information and provides the aggregates activity feeds information to the user interface 108. For the display of contact information on the user interface 108, the activity feeds information generally represents presence information. The presence information indicates a current presence status of the contact, for example, available, busy or away. The presence information is typically obtained from the IM server computer 114. In examples, the presence information may be obtained from other sources.

The example cache processing module 306 builds a person object from contact information obtained from one or more sources. In some examples, contact information is obtained from only one source. In other examples, particularly where multiple contact records may be stored for the same person, the contact information is obtained from multiple sources.

The example cache processing module 306 typically builds the person object when a specific user or other action occurs, such as the user moving a cursor so that the cursor hovers over a name in an email message or a document. For example, the person object may be built when the cursor hovers over a name in the To field of an email message. As another example, the person object may be built when the user adds an email address to an email message, or when an email message is received from a specific contact. Other examples actions which initiate the building of the person object are possible.

As discussed in detail later herein, when the person object is built, the cache processing module 306 first determines an entry identifier for the person. In examples, the entry identifier may be a name, an alias, an email address or a fixed address. Other examples of entry identifiers are possible. The entry identifier typically includes metadata that indicates whether a contact is a global address contact, an email contact or a third party contact.

The cache processing module 306 uses the entry identifier to determine whether an entry corresponding to the entry identifier exists in a global data store, for example the directory server computer 110. In examples, a flag or other type of metadata may indicate whether a person corresponding to the entry identifier may be a global address contact. When it is determined that an entry corresponding to the entry identifier exists in the global data store, contact information for the person is obtained from the global data store and added to the person object. The contact information is stored in a contact object that is part of the person object. In addition, a person identifier is created for the person and the person identifier is also stored in the person object. In examples, the person identifier is a global unique identifier (GUID) that identifies the person.

When the entry identifier indicates that a contact is an email contact, contact information is obtained from a contacts store, for example contacts store 106, which is associated with the email application running on the client computer 102. When contact information exists for the person in the contacts store, the contact information is obtained from the contacts store and added as a second contact object to the person object. In addition, the person identifier is stored in the second contact object. Further, when contact information for the person also exists in the global data store, a global address identifier is added to the second contact object. The global address identifier is used to locate contact information for the person in the global data store. Thus, via accessing the second contact object, the global address identifier may be used to link back to the global data store and obtain contact information for the person from the global data store.

In addition to obtaining contact information from the contacts store, an attempt is made to locate contact information from third party sources. Third party sources may include social networks such as Facebook and LinkedIn or other similar sources. In some examples, when the entry ID corresponds to a name of the person to be located, the cache processing module 306 may send the name of the person to the third party source. If the third party source has contact information for the person, the third party source may send the contact information to the cache processing module 306. When the cache processing module 306 receives the contact information from the third party source, the cache processing module 306 creates a new contact object for the person, for example a third contact object, and stores the new contact object in the people object. The cache processing module 306 also inserts the person identifier in the new contact object.

In some examples, the cache processing module 306 sends one or more email addresses to one or more third party sources. The email addresses are email addresses associated with the entry identifier. For example, the entry identifier may be derived from an email address. The email system running on client computer 102 may also include other email addresses associated with a person corresponding to the entry identifier. When the third party sources receive the one or more email addresses, the third party sources may send contact information corresponding to the one or more email addresses to the client computer 102. When the cache processing module 306 receives the contact information, the cache processing module creates or updates another contract object, for example a fourth contact object to store the contact information from the third party sources. The person identifier is also stored in the fourth contact object. The fourth contact object is also stored in the people object.

In some examples, an entity associated with the example system 100, for example a business organization, may have a relationship with one or more of the third party sources. For example, the business organization may have a customer identification number that is registered with one or more third party sources. In these examples, the cache processing module 306 may send the customer identification number to one or more third party sources. When the one or more third party sources receive the customizer identification number, the one or more third party sources may send contact information for the customer to client computer 102.

The person object, including one or more contact objects is stored in a memory cache on the client computer 102. The memory cache is part of the cache processing module 306.

When a person object includes more than one contact object, the example linking module 308 links the contact objects. Thus, a first contact object may be linked to a second contact object, the second contact object may be linked to a third contact object, etc. Linking the contact objects permits efficient access of contact information stored in the contact objects.

The example presence processing module 310 obtains presence information for the person and updates the user interface 108 with the presence information. The presence information is typically obtained from an instant messaging server computer, for example the IM server computer 114. An example of an instant messaging server computer is the Lync™ communications server computer. The presence information may be displayed on a presence indicator, for example presence indicator 202 on a contact information display, for example on contact information display 200. The presence indicator may be set to a color that indicates presence—for example, a green color to indicate an available status.

Figure 4:
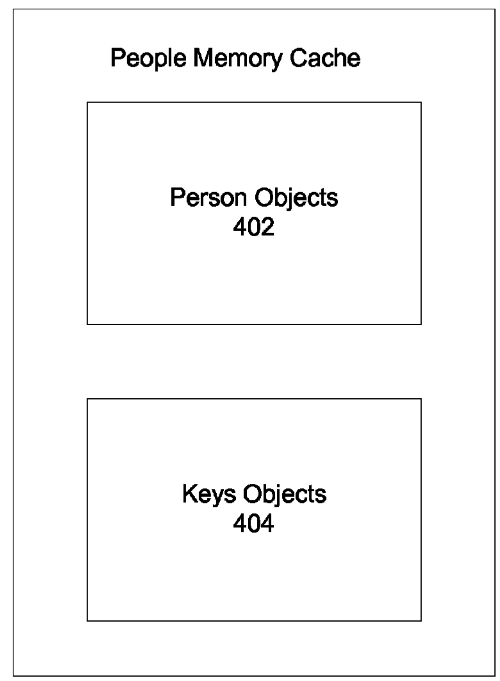
FIG. 4 shows an example people memory cache.

FIG. 4 shows an example people memory cache 400 that provides cached contact information for a plurality of user contacts. The people memory cache includes person objects 402 and keys objects 404. The person objects 402 comprise one or more person objects. Each person object comprises one or for contact objects. The contact objects provide contact information for the person. A person identifier is also stored in each contact object. The person identifier is a GUID that identifies the person object. When contact information is found in a global data store, for example a global address list, the contact object also stores a global address identifier which locates the contact information in the global data store.

The keys objects 404 comprise one or more keys objects. Each keys object includes keys information for a specific person object. Each keys object includes the entry identifier for the person object and also includes the person identifier for the person object. A key object may also include one or more email addresses associated with the person.

Figure 5:
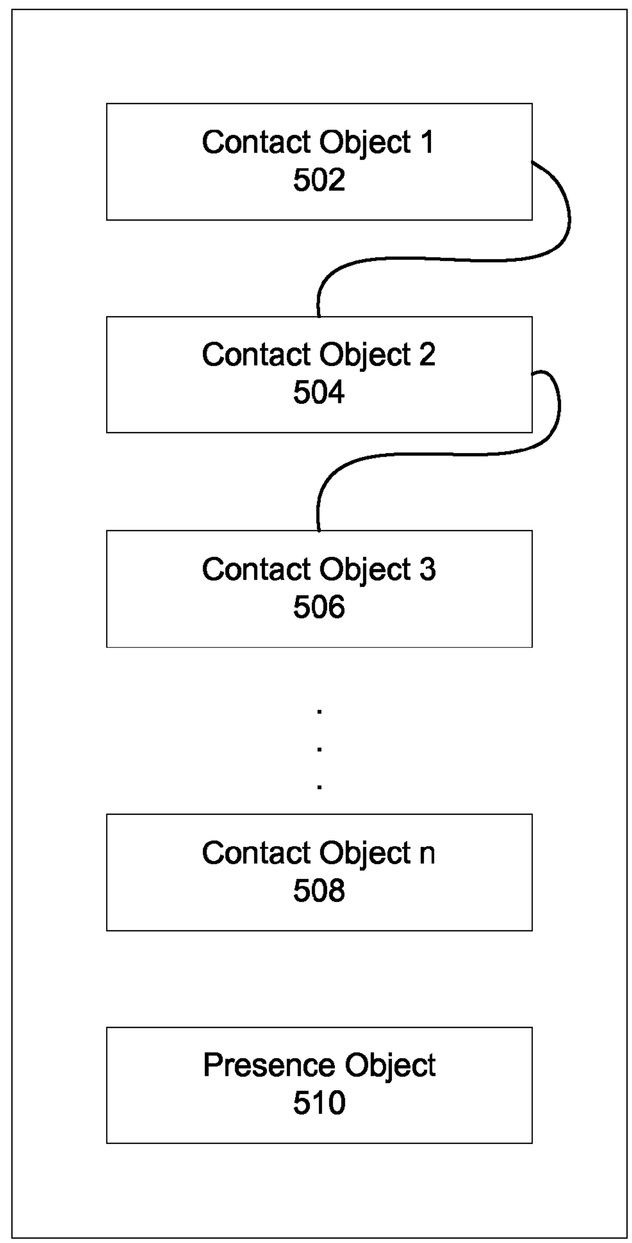
FIG. 5 shows an example people object.

FIG. 5 shows an example person object 500. The example person object 500 includes one or more contact objects 502, 504, 506, 508 and a presence object 510. Each contact object includes contact information for a person. Some example contact information includes a name, address, business title, and one or more phone numbers for the person. Other examples of contact information are possible. The example presence object 510 includes presence information for the person. The presence information typically comprises an availability status for the person. In the example person object 500, each contact object is shown as being linked to each other. Linking the contact objects improves the efficiency of obtaining contact information from the contact objects.

Figure 6:
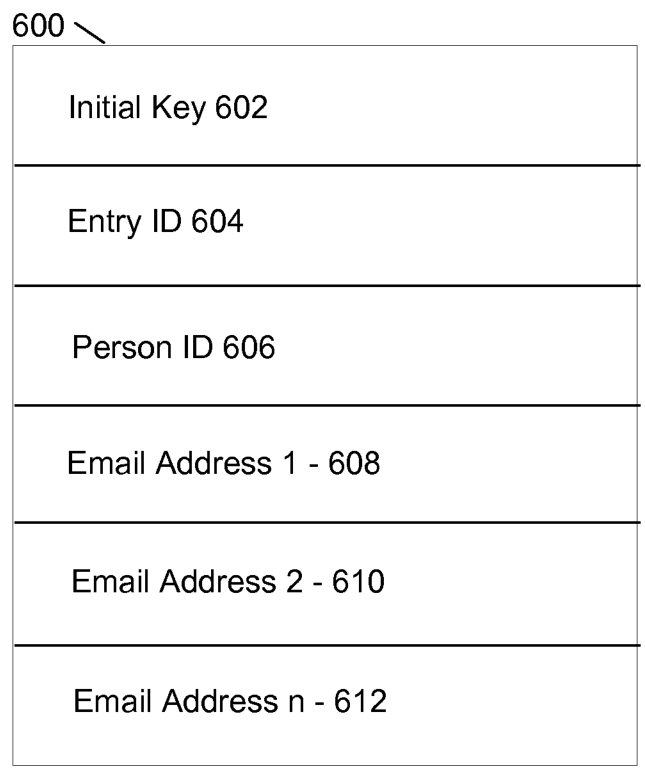
FIG. 6 shows an example keys object.

FIG. 6 shows an example keys object 600. The example keys object 600 includes a plurality of identifiers that are used to locate corresponding person object. The example identifiers include an initial key 602, an entry identifier 604, and a person identifier 606 and may also include one or more email addresses 608, 610, 612. The initial key 602 is a contact identifier that may be provided to the example system 100. In examples, the initial key 602 may be a name, an email address, an alias or a fixed address. In examples, the entry identifier 604 may be derived from the initial key 602. In other examples, the entry identifier 604 and the initial key 602 may be the same identifier.

Figure 7:
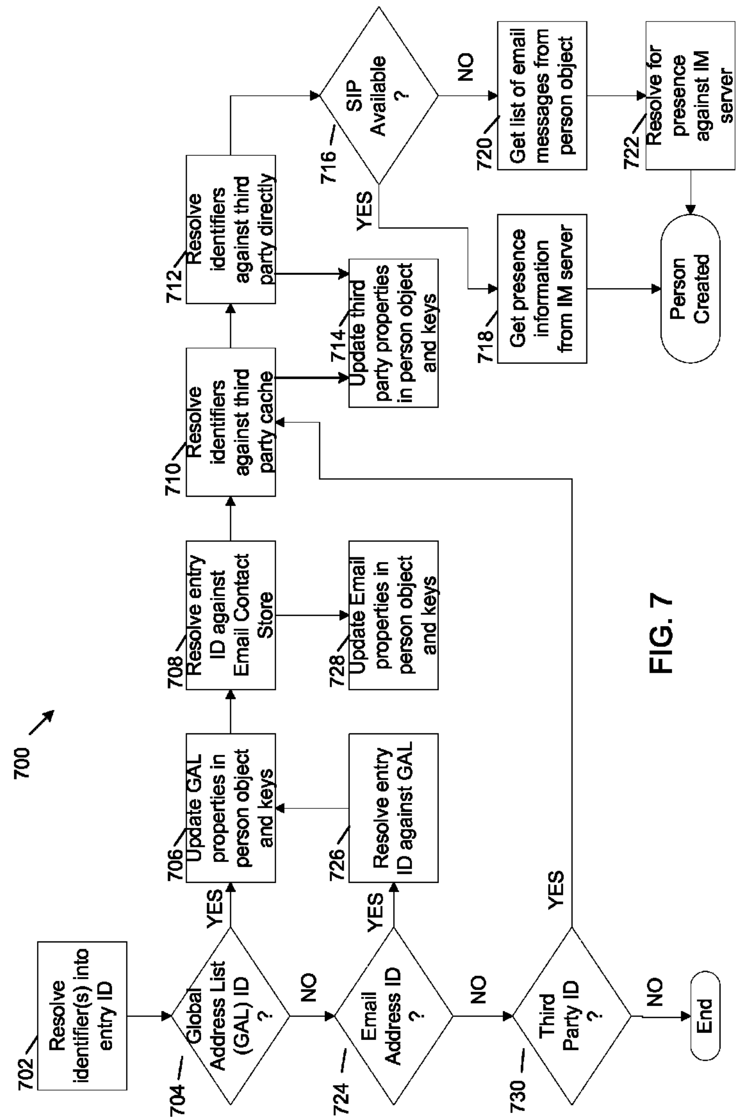
FIG. 7 shows a flowchart of an example method for generating a person object.

FIG. 7 shows an example flowchart of a method 700 for creating a person object. The method 700 is activated when a user action identifies a person and a person object for the person is not currently in the memory cache on client computer 102. An example of a user action that identifies a person is when the user hovers a cursor over the name of the person on an email message or a document. For example, the user may hover the cursor over the To or From field on the email message.

At operation 702, when the user action occurs, one or more identifiers may be resolved into an entry ID. The entry ID may be an email address, a name or an alias. The entry ID includes metadata which indicates whether a person corresponding to the entry ID may have a record in a global address list or an email system contact store. In examples, when the user action occurs, the user interface, for example the user interface 108 provides the entry ID to the people framework 104. However, in other examples the user interface may provide the people framework 104 with one or more names, none of which is an entry ID. When an entry ID is not provided and a plurality of names are provided instead, the people framework 104 determines the entry ID from the plurality of names.

At operation 704, a determination is made as to whether the entry ID is an identifier for a global address list (GAL) contact. A GAL is a global directory service, for example the Active Directory® directory service. In examples, metadata from the entry ID may be used to determine whether the entry ID is an identifier for a GAL contact. In examples, the entryID is a property of the GAL contact that uniquely identifies that the GAL contact has a record in the global address list. When a determination is made at operation 704 that the entry ID is an identifier for a GAL contact, at operation 706, GAL properties are updated in a person object and in identifier keys associated with the person object. The GAL properties are obtained from the global address list for the GAL contact. Example properties may include a name for the GAL contact, one or more telephone numbers, a job title and an email address. Other example properties are possible. The identifier keys include one or more identifiers that are associated with the person object. One identifier key is a person ID that identifies the person object. Other identifier keys may include one or more email addresses associated with the person, the entry ID and an initial identifier from which the entry ID is created. Other examples of identifier keys are possible.

At operation 708, as explained in more detail later herein, the entry ID is resolved against a contact store for the email system running on client computer 102. When the entry ID is resolved against the contact store, a determination is made as to whether a contact record for the GAL contact exists in the contact store for the email system. When a determination is made that a contact record for the GAL contact does exist in the contact store for the email system, at operation 708, properties for the contact obtained from the contact store are updated in the person object and the keys. The properties for the contact obtained from the contact store may include such properties as a name for the person, one or more telephone numbers, a job title and an email address. Where the properties for the contact obtained from the contact store are identical to the properties for the contact obtained from the GAL, the properties are not added to the person object and keys. However, when properties obtained from the contact store do not currently exist in the person object and keys or when properties obtained from the contact store are different than similar properties in the person object and keys, the properties obtained from the contact store are added to the person object and keys.

At operation 710, as explained in more detail later herein, one or more identifiers are resolved against a third party cache on a client computer, for example on client computer 102. In this disclosure, third parties refers to entities that are not part of a business organization that includes client computer 102, directory server computer 110, email server computer 112 and IM server computer 114. Examples of third parties include social networks such as Facebook and Linked-In. Other examples of third parties are possible. The third party cache includes contact information provided by the third parties. The identifiers any include the person ID and one or more email addresses obtained from the keys. Resolving the identifiers against the third party cache involves determining whether the third party cache includes contact information that matches one of the identifiers.

At operation 712, one or more email addresses are resolved against the third parties directly. Resolving the email addresses against the third parties directly involves sending the third parties a list of email addresses associated with the entry ID. For example email addresses included in the keys for the person object corresponding to the entry ID may be sent from the people framework 104 to the third parties. The third parties may send contact information corresponding to the email addresses to the people framework 104. At operation 714, the person object and keys are updated with contact information received from the third parties.

At operation 704, when a determination is made that the entry ID is not an identifier for a GAL contact, at operation 724, a determination is made whether the entry ID is an email address. At operation 724, when it is determined that the entry ID is an email address, at operation 726, as explained in detail later herein, the entry ID is resolved against the global address list. Resolving the entry ID against the global address list includes determining whether there is a matching GAL entry ID or determining whether a match is found for one or more email addresses associated with the entry ID. When a match is found, contact data corresponding to the match is stored in the person object and keys for the entry ID.

At operation 724, when it is determined that the entry ID is not an email address, at operation 730, a determination is made as to whether the entry ID represents a third party contact. When it is determined at operation 730 that the entry ID represents a third party contact, at operation 710, as discussed, the entry ID is resolved against a third party cache and at operation 712, as discussed, the entry ID is resolved against a third party directly.

At operation 716, a determination is made as to whether the Session Initiation Protocol (SIP) is available. The SIP is a signaling protocol used for communication sessions over the Internet. An instant messaging server computer, for example IM server computer 114, may use SIP to determine presence information for a person.

When a determination is made at operation 716 that SIP is available, at operation 718, presence information for the person is obtained from the IM server computer 114. An example of IM server computer 114 is the Microsoft Lync™ communications server computer. When a determination is made at operation 716 that SIP is not available, a list of email messages is obtained from the person object. The list of email messages is typically obtained from the keys portion of the person object. At operation 722, the email messages are sent to IM server computer 114 to determine whether the IM server computer 114 can resolve the email messages and provide presence information.

Figure 8:
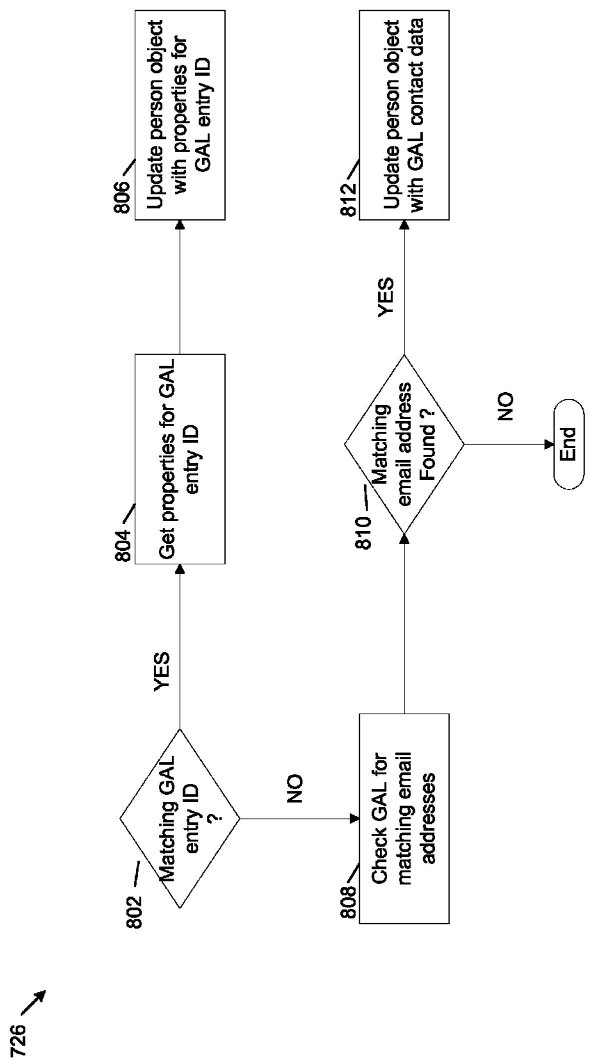
FIG. 8 shows a flowchart of an example method for resolving an entry ID against a global address list.

FIG. 8 shows an example flowchart for operation 726 for resolving the entry ID against the global address list. At the start of operation 726, a determination has been made that the entry ID is an email address ID, corresponding to a contact in the contact store of the email application running on client computer 102. At operation 802, a determination is made as to whether there is a matching GAL entry ID associated with the entry ID. When it is determined that there is a matching GAL entry ID associated with the entry ID, at operation 804, properties are obtained for a person corresponding to the GAL entry ID. The properties may include a name for the person, an email address, a job title, one or more phone numbers, etc. At operation 806, the person object is updated with the properties.

When a determination is made at operation 802 that there is not a matching GAL entry ID associated with the entry ID, at operation 808, one or more email addresses are obtained from the keys associated with the entry ID. At operation 810, the one or more email addresses are checked against the GAL to determine whether any contacts are found in the GAL which match the one or more email addresses. When is determined at operation 810 that a contact is found in the GAL that matches the one or more email addresses, the person object is updated with GAL contact data.

Figure 9:
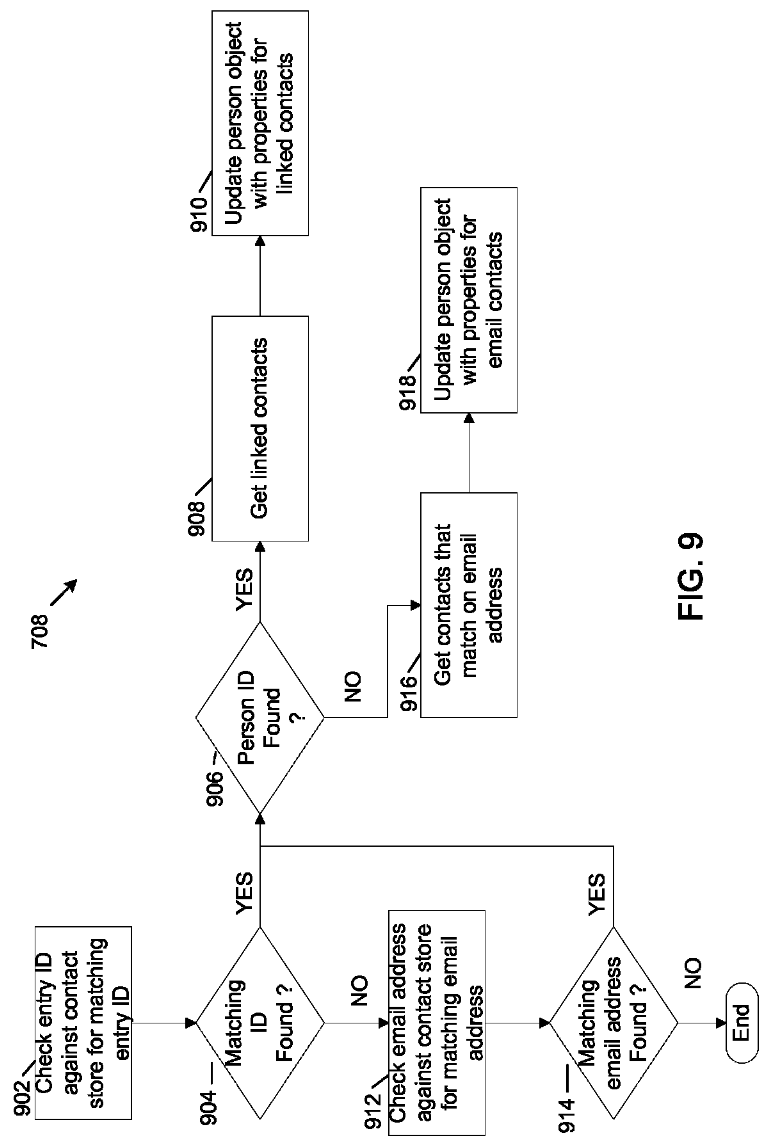
FIG. 9 shows a flowchart of an example method for resolving the entry ID against an email contact store.

FIG. 9 shows an example flowchart for operation 708 for resolving the entry ID against the email contact store. At operation 902, the entry ID is checked against the contact store for a matching entry ID. At operation 904, a matching ID is found, meaning that there is a contact matching the entry ID in the contact store. At operation 906, a determination is made as to whether a person ID exists for the contact. When it is determined at operation 906 that a person ID is found for the contact, at operation 908 all contacts linked to the person ID are obtained. As discussed earlier herein, in relation to FIG. 5, the person ID is linked to a first contact in the person object and each contact object in the person object is linked to another contact object. At operation 910, the person object is updated with properties for the linked contact objects.

When a determination is made at operation 904 that a matching ID is not found, meaning that there is not a contact matching the entry ID in the contact store, at operation 902, an email address associated with the entry ID is used to search the contact store for a matching email address. At operation 914, a determination is made as to whether a matching email address is found. When it is determined at operation 914 that a matching email address is found, at operation 906, a determination is made as to whether a person ID exists for the contact corresponding to the matching email address.

When a determination is made at operation 906 that a person ID is not found for the contact, at operation 916, all contacts are obtained for which an email address associated with the entry ID matches a corresponding email address in the contact store. At operation 918, the person object is updated with properties for the contacts obtained via the matching email address.

Figure 10:
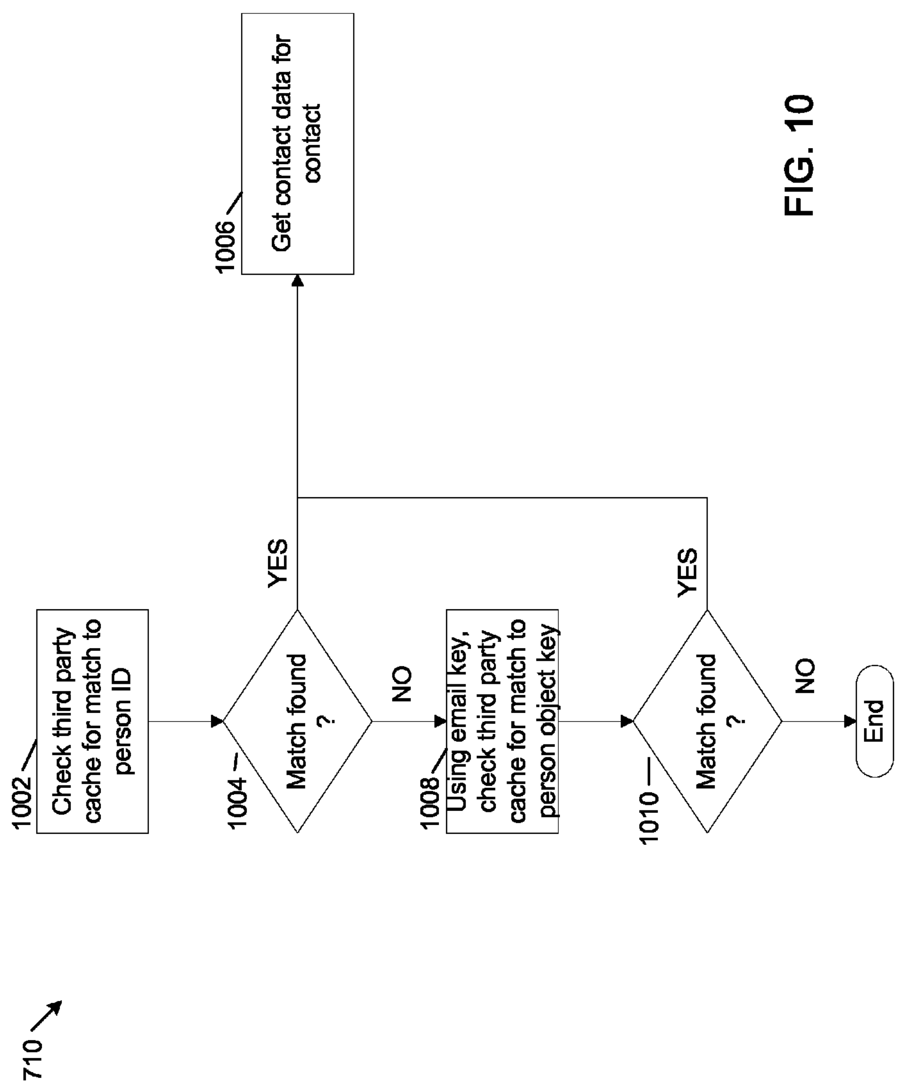
FIG. 10 shows a flowchart of an example method for resolving the entry ID against a third party cache on a client computer.

FIG. 10 shows an example flowchart for operation 710 for resolving the entry ID against a third party cache on a client computer, for example on client computer 102. The third party cache includes contact information provided by the third parties such as Facebook and Linked-In.

At operation 1002, the third party cache is checked to determine whether a match can be found for a contact corresponding to the person ID. At operation 1004, when it is determined that a contact from the third party cache matches the person ID, at operation 1006, contact data is obtained from the third party cache for the contact.

At operation 1004, when it is determined that no matches for the person ID can be found in the third party cache, one or more email addresses are obtained from the keys for the person object. The third party cache is then checked to determine whether a match can be found for the one or more email addresses in the third party cache. At operation 1010, when it is determined that a match can be found for the one or more email addresses in the third party cache, at operation 1006, contact data is obtained from the third party cache for the contact.

Figure 11:
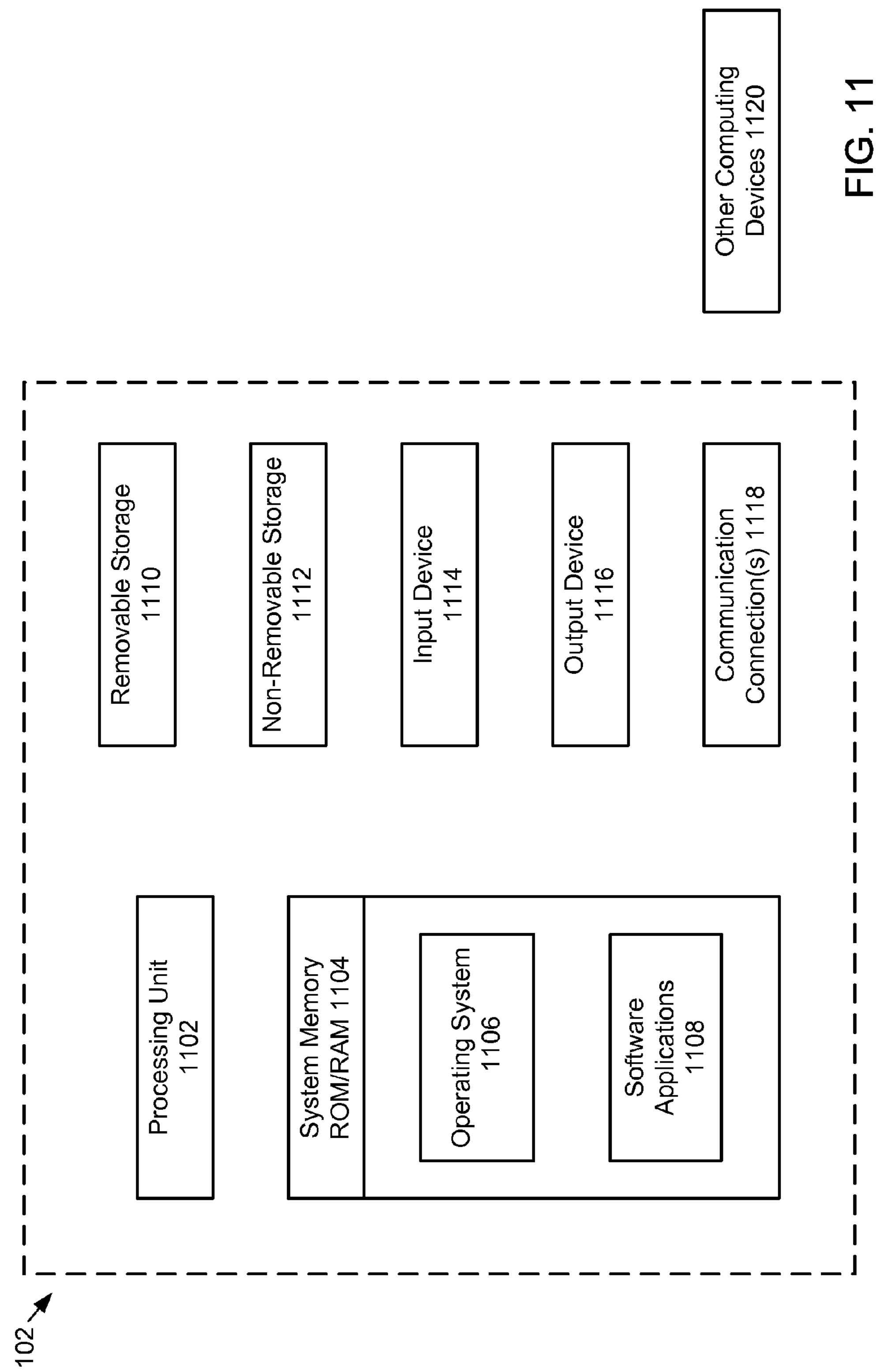
FIG. 11 shows example components of the client computer of FIG. 1.

With reference to FIG. 11, example components of client computer 102 are shown. In example embodiments, client computer 102 is a computing device. Client computer 102 can include input/output devices, a central processing unit ("CPU"), a data storage device, and a network device. Client computer 102 can also be a mobile computing device, such as a laptop, tablet, convertible, or other handheld device like a smartphone or cellular telephone.

In a basic configuration, client computer 102 typically includes at least one processing unit 1102 and system memory 1104. Depending on the exact configuration and type of computing device, the system memory 1104 may be volatile (such as RAM), non-volatile (such as ROM, flash memory, etc.) or some combination of the two. System memory 1104 typically includes an operating system 1106 suitable for controlling the operation of a client computer. The system memory 1104 may also include one or more software applications 1108 and may include program data.

The client computer 102 may have additional features or functionality. For example, client computer 102 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 11 by removable storage 1110 and non-removable storage 1112. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client computer 102. Any such computer readable storage media may be part of client computer 102. Client computer 102 may also have input device(s) 1114 such as keyboard, mouse, pen, voice input device, touch input device, etc. Output device(s) 1116 such as a display, speakers, printer, etc. may also be included.

Consistent with embodiments of the present disclosure, the input device(s) 1114 may comprise any motion detection device capable of detecting the movement or gesture of a user. For example, the input device(s) 1114 may comprise a Kinect® motion capture device, from Microsoft Corporation, comprising a plurality of cameras and a plurality of microphones.

The client computer 102 may also contain communication connections 1118 that allow the device to communicate with other computing devices 1120, such as over a network in a distributed computing environment, for example, an intranet or the Internet. Communication connections 1118 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Embodiments of the present disclosure may be practiced via a system-on-a-chip (SOC) where each or many of the components illustrated in FIG. 11 may be integrated onto a single integrated circuit. Such an SOC device may include one or more processing units, graphics units, communication units, system virtualization units and various application functionality all of which are integrated (or "burned") onto the chip substrate as a single integrated circuit. When operating via an SOC, the functionality, described above, with respect to the present disclosure may be operated via application-specific logic integrated with other components of the computing device 102 on the single integrated circuit (chip).

The various embodiments described above are provided by way of illustration only and should not be construed to limiting. Various modifications and changes that may be made to the embodiments described above without departing from the true spirit and scope of the disclosure.

What is claimed is:

1. A method implemented on an electronic computing device for creating a data structure that represents a person, the method comprising:

on the electronic computing device, receiving a first identifier, the first identifier identifying a first person;

storing the first identifier in a data structure in a first memory cache on the electronic computing device, the data structure comprising a person object, the person object comprising one or more contact objects;

determining whether the first identifier indicates that the first person is a global address list contact;

when it is determined that the first identifier indicates that the first person is a global address list contact:

obtaining first properties for the first person from a global address list store, the first properties comprising first contact information for the first person; and storing the first properties in a first contact object in the data structure;

when it is determined that the first identifier does not indicate that the first person is a global address list contact, determining from the first identifier whether the first person is an email contact, the email contact being a contact in a contact store for an email application running on the electronic computing device;

when it is determined that the first identifier indicates that the first person is an email contact:

obtaining second properties for the first person from the contact store, the second properties comprising second contact information for the first person;

storing the second properties in the data structure in the first memory cache on the electronic computing device, the second properties being stored in a second contact object in the data structure;

determining whether the second properties include a global address identifier, the global address identifier identifying contact information comprising at least an address for the first person in the global address list store; and when it is determined that the second properties includes the global address identifier, storing the global address identifier in the second contact object;

creating a second identifier for the first person, the second identifier being a person identifier that identifies the first person;

storing the second identifier in the first contact object; and storing the second identifier in the second contact object.

2. The method of claim 1 further comprising storing the first identifier in a keys object in the memory cache, the keys object being associated with the person object.

3. The method of claim 1, wherein the first identifier is derived from an email address, an instant messaging address, a name or an alias.

4. The method of claim 1, wherein the first identifier is received when a user hovers over a personal control in a document or email.

5. The method of claim 1, further comprising determining whether one or more email addresses are associated with the first contact in the global address list and when it is determined that one or more email addresses are associated with the first contact in the global address list, storing the one or more email addresses in the first memory cache.

6. The method of claim 1, wherein determining from the first identifier whether the first person is a global address list contact comprises using metadata from the first identifier to determine whether the first contact is a global address list contact.

7. The method of claim 1, wherein determining from the first identifier whether the first person is an email contact comprises using metadata from the first identifier to determine whether the first contact is an email contact.

8. The method of claim 1, further comprising when it is determined that the second properties do not include a global address identifier:

determining whether the second properties includes one or more email addresses; and when it is determined that the second properties include one or more email addresses:

for each of the one or more email addresses, determining whether a match is found between the email address and a contact in the global address list; and when it is determined that a match is found between the email address and the contact in the global address list, obtaining contact information from the global address list corresponding to the email address and storing the contact information in the first memory cache.

9. The method of claim 1, further comprising:

determining whether a person identifier exists for the first contact;

when it is determined that a person identifier exists for the first contact, using the person identifier determine whether one or more additional contacts are linked to the first contact; and when it is determined that one or more additional contacts are linked to the first contact:

for each of the one or more additional contacts, obtaining contact information for the contact from the store associated with the email application and updating the data structure in the first memory cache with the contact information.

10. The method of claim 9, further comprising:

when it is determined that a person identifier does not exist for the first contact:

determining an email address that is associated with the first identifier;

using the email address, determining whether any contacts in the store associated with the email application have an email address that matches the email address that is associated with the first identifier;

when it is determined that one or more contacts in the store associated with the email application have an email address that matches the email address that is associated with the first identifier:

determining whether each matching contact has an associated person identifier;

when it is determined that a matching contact has an associated person identifier, using the person identifier determine whether one or more additional contacts are linked to the matching contact; and when it is determined that one or more additional contacts are linked to the matching contact, for each of the one or more additional contacts, obtaining contact information for the contact from the store associated with the email application and updating the data structure in the first memory cache with the contact information.

11. The method of claim 1 further comprising:

when it is determined from the first identifier that the first person is not a global address list contact and when it is determined from the first identifier that the first person is not an email contact:

using the first identifier, determining whether a contact matching the first identifier exists in a second memory cache, the second memory cache storing contact information for third parties; and when it is determined that one or more contacts matching the first identifier exist in the second memory cache, for each contact that matches the first identifier in the second memory cache, obtaining contact information for the contact from the second memory cache and updating the first data structure in the first memory cache with the contact information.

12. The method of claim 11, further comprising:

when it is determined that no contacts match the first identifier in the second memory cache:

obtaining one or more person identifiers from the first memory cache;

for each person identifier, obtain one or more email addresses associated with the person identifier;

for each of the email addresses, determining whether a contact matching the email address exists in the second memory cache;

when it is determined that one or more contacts matching the email address exists in the second memory cache, obtaining contact information for the contact from the second memory cache and updating the first data structure in the first memory cache with the contact information.

13. The method of claim 1, further comprising:

obtaining one or more email addresses from a list of email addresses stored on the electronic computing device;

sending one or more of the email address to one or more third party sources;

obtaining contact information from one or more of the third party sources;

updating the data structure in the first memory cache with the contact information; and updating the first memory cache with each mail address associated with the contact information.

14. The method of claim 1, further comprising:

when the first identifier indicates that the first person is a global address list contact, determining whether access to third party contact information is available via the session initiation protocol;

when it is determined that access to third party contact information is available via the session initiation protocol:

obtaining a third identifier from the first identifier, the third identifier having an address associated with the session initiation protocol; and using the third identifier to obtain presence information for the first person from a server computer; and when it is determined that access to third party contact information is not available via the session initiation protocol:

obtaining one or more email addresses from a list of email addresses stored on the electronic computing device; and using the one or more email addresses to obtain presence information for the first person from the server computer.

15. An electronic computing device comprising:

a processing unit; and system memory, the system memory including instructions that, when executed by the processing unit, cause the electronic computing device to:

receive a first identifier, the first identifier identifying a first person;

store the first identifier in a data structure in a first memory cache on the electronic computing device, the data structure comprising a person object, the person object comprising one or more contact objects;

determine whether the first identifier indicates that the first person is a global address list contact;

when it is determined that the first identifier indicates that the first person is a global address list contact:

obtain first properties for the first person from a global address list store, the first properties comprising first contact information for the first person; and store the first properties in a first contact object in the data structure;

when it is determined that the first identifier does not indicate that the first person is a global address list contact, determining from the first identifier whether the first person is an email contact, the email contact being a contact in a contact store for an email application running on the electronic computing device;

when it is determined that the first identifier indicates that the first person is an email contact:

obtain second properties for the first person from the contact store, the second properties comprising second contact information for the first person;

store the second properties in the data structure in the first memory cache on the electronic computing device, the second properties being stored in a second contact object in the data structure;

determine whether the second properties include a global address identifier, the global address identifier identifying contact information comprising at least an address for the first person in the global address list store; and when it is determined that the second properties includes the global address identifier, storing the global address identifier in the second contact object;

create a second identifier for the first person, the second identifier being a person identifier that identifies the first person;

store the second identifier in the first contact object; and store the second identifier in the second contact object.

16. The electronic computing device of claim 15, wherein the one or more contact objects are created during a runtime operation on the electronic computing device.

17. The electronic computing device of claim 15, wherein the one or more contact objects are linked to each other.

18. The electronic computing device of claim 15, wherein the person object further comprises a presence object, the presence object providing presence information associated with the person.

19. The electronic computing device of claim 15, wherein one or more contact objects include contact information for an organization.

20. A computer readable storage device comprising instructions that, when executed by an electronic computing device, cause the electronic computing device to:

receive a first identifier, the first identifier identifying a first person, the first identifier being derived from an email address, an instant messaging address, a name or an alias;

store the first identifier in a data structure in a first memory cache on the electronic computing device, the data structure comprising a person object, the person object comprising one or more contact objects;

determine from metadata associated with the first identifier whether the first identifier indicates that the first person is a global address list contact;

when it is determined that the first identifier indicates that the first person is a global address list contact:

obtain first properties for the first person from a global address list store, the first properties comprising first contact information for the first person; and store the first properties in a first contact object in the data structure;

when it is determined that the first identifier does not indicate that the first person is a global address list contact, determine from metadata associated with the first identifier whether the first person is an email contact, the email contact being a contact in a contact store for an email application running on the electronic computing device;

when it is determined that the first identifier is an email contact:

obtain second properties for the first person from the contact store, the second properties comprising second contact information for the first person;

store the second properties in the data structure in the first memory cache on the electronic computing device, the second properties being stored in a second contact object in the data structure;

determine whether the second properties include a global address identifier, the global address identifier identify the first person in the global address list store; and when it is determined that the second properties includes the global address identifier, store the global address identifier in the second contact object;

when it is determined that the second properties do not include a global address identifier:

determine whether the second properties includes one or more email addresses; and when it is determined that the second properties include one or more email addresses:

for each of the one or more email addresses, determine whether a match is found between the email address and a contact in the global address list; and when it is determined that a match is found between the email address and the contact in the global address list, obtain contact information from the global address list corresponding to the email address and store the contact information in the first memory cache;

create a second identifier for the first person, the second identifier being a person identifier that identifies the person;

store the second identifier in the first contact object;

store the second identifier in the second contact object;

obtain one or more email addresses from a list of email addresses stored on the electronic computing device;

send one or more of the email address to one or more third party sources;

obtain contact information from one or more of the third party sources;

update the data structure in the first memory cache with the contact information;

update the first memory cache with each mail address associated with the contact information;

when the first contact is a global address identifier contact, determine whether access to third party contact information is available via the session initiation protocol;

when it is determined that access to third party contact information is available via the session initiation protocol:

obtain a second identifier from the first identifier, the second identifier having an address associated with the session initiation protocol; and use the second identifier to obtain presence information for the first contact from a server computer; and when it is determined that access to third party contact information is not available via the session initiation protocol:

obtain one or more email addresses from a list of email addresses stored on the electronic computing device; and use the one or more email addresses to obtain presence information for the first contact from the server computer.

* * * * *